Nov. 16, 1926. 1,607,347
N. HEMMAN
BEVERAGE DISPENSER
Filed Jan. 7, 1926 2 Sheets-Sheet 1
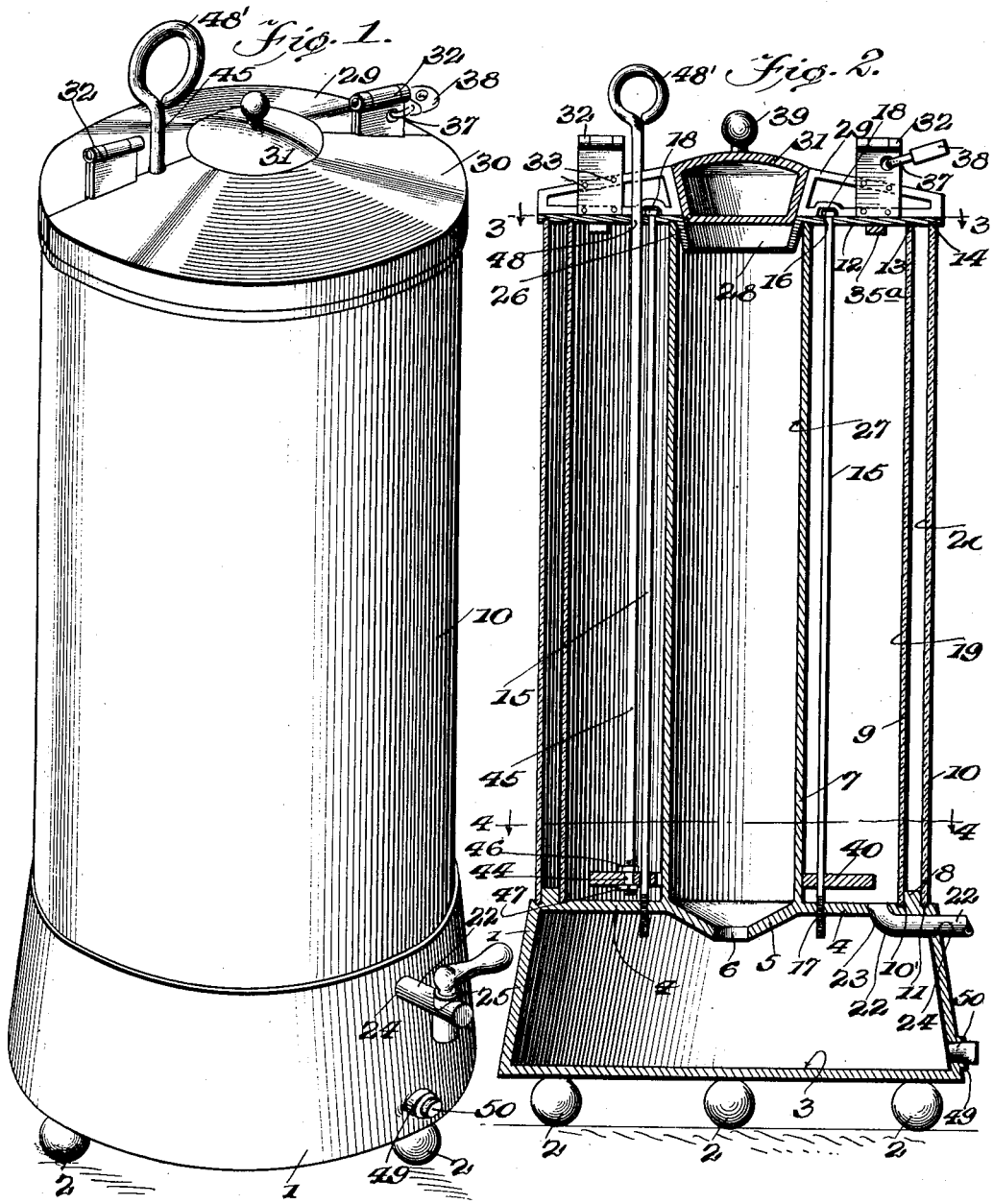
INVENTOR
Nelson Hemman,
BY
ATTORNEYS

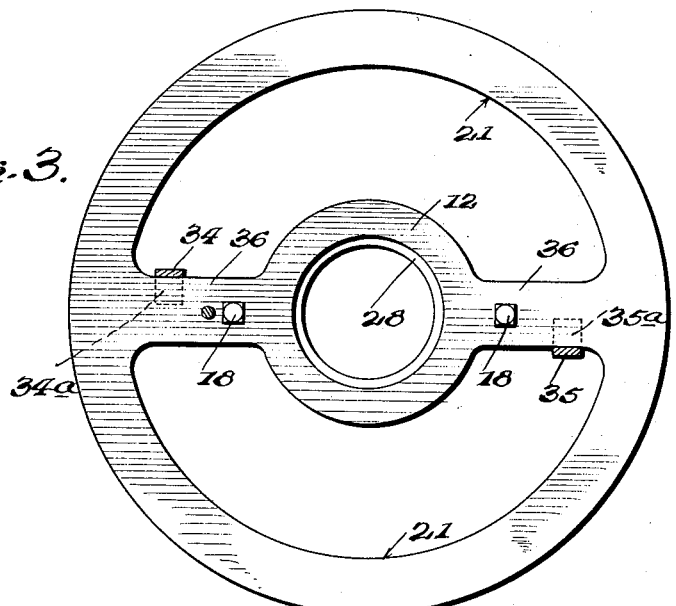
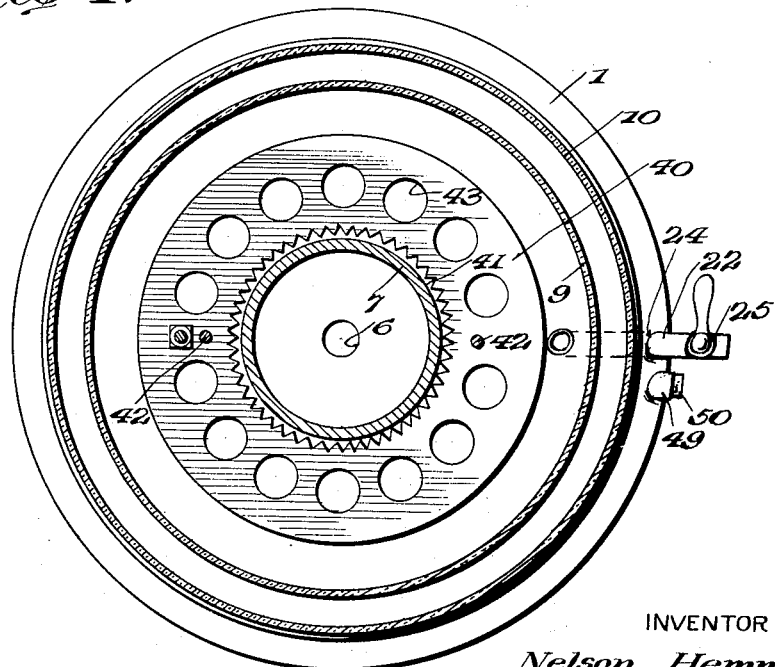

Patented Nov. 16, 1926.

1,607,347

UNITED STATES PATENT OFFICE.

NELSON HEMMAN, OF EL PASO, TEXAS.

BEVERAGE DISPENSER.

Application filed January 7, 1926. Serial No. 79,858.

My invention relates to improvements in dispensers or containers for liquids, and it consists in the combinations, constructions and arrangements herein described and claimed.

An object of the invention is the provision of a liquid dispenser which affords facilities for holding a beverage so that the beverage will be subjected to the action of a refrigerant and will be kept at a temperature which may be sufficiently low to cause partial congellation of the beverage so that the beverage may be dispensed with particles thereof frozen.

A further object of the invention is the provision in a beverage dispenser of the character described, of a reliable and readily operable means for scraping frozen particles of the beverage within the dispenser from a wall of the beverage holding chamber of the dispenser.

A still further object of the invention is the provision of a dispenser which can be conveniently and thoroughly cleaned when desired.

Other objects and advantages of the invention will be apparent from the following description, considered in conjunction with the accompanying drawings, in which:

Figure 1 is a perspective view of a beverage dispenser embodying the invention,

Figure 2 is a vertical section through the dispenser,

Figure 3 is a horizontal section through the dispenser substantially along the line 3—3 of Figure 2, and Figure 4 is a horizontal section through the dispenser, substantially along the line 4—4 of Figure 2.

A dispenser embodying the invention comprises a hollow base 1 which may be supported firmly on suitably spaced legs such as indicated at 2. The base 1 is formed to produce a chamber 3 therewithin. The top of the base, indicated at 4, is substantially flat, and is formed with a centrally depressed or concavo-convex portion 5 having a central orifice 6 of relatively slight area formed therein. The top 4 of the base also is formed with an integral upstanding annular casing 7 which is joined to the top 4 of the base at the edge of the concavo-convex portion 5 and is of considerable height. The top wall 4 of the base also is formed with a short upstanding annular extension or rib 8 which is near the marginal edge of the top 4 of the base, and is concentric with the casing 7.

The casing 7 constitutes the inner casing of the dispenser and is encircled by an intermediate annular casing 9 which preferably is formed of transparent glass, and is of sufficient diameter to fit at its lower end snugly within the rib 8, the lower edge of the casing 9 preferably fitting into an annular groove 10' in the top wall of the base. An outer annular casing 10 which also is formed of transparent glass encircles the intermediate casing 9 and has the lower edge portion thereof fitting snugly in an annular groove 11 in the top 4 of the base at the outer side of the rib 8, the lower end portion of the casing 9 fitting snugly against the outer face of the rib 8.

The casings 7, 9 and 10 terminate at their upper ends at the same level. A top plate 12 is super-imposed on the casings 7, 9 and 10 and has annular grooves 13 and 14 in its lower face in which the upper ends of the casings 9 and 10, respectively, are received. The top plate 12 is connected with the top 4 of the base by means of rods 15 which extend through openings 16 in the top plate 12 and have the lower end portions thereof screwed into threaded openings 17 in the top 4 of the base until heads 18 at the upper ends of the rods are clamped against the upper face of the top plate 12 and the casings 9 and 10 thus are clamped to the top 4 of the base, and the top plate 4 also is clamped securely against the upper ends of the casings 7, 9 and 10. The arrangement is such that an annular chamber 19 is produced between the casings 7 and 9 and a second or outer annular chamber or space 20 is produced between the casings 9 and 10.

The top plate 12 is shown to advantage in Figure 3 and is formed with arcuate apertures 21 of relatively great area at the upper end of the chamber 19, while the portion of the top plate 12 which is disposed above the chamber 20 is imperforate. The chamber 20 therefore is air tight and constitutes a dead air space.

The chamber 19 has an outlet at its lower end through a discharge tube 22 which leads from an opening 23 in the top wall 4 of the base into the chamber 3 in the base, and thence through an opening 24 in a side wall of the base. The outer end portion of the discharge tube 22 may be provided with a suitable valve or faucet as indicated at 25. The opening 23 in the top wall 4 of the base is located adjacent to the outer wall of the compartment 19 and the discharge tube 22 of course has fluid-tight contact with the walls of the openings 23 and 24.

The central portion of the top plate 12 is formed to produce a relatively large opening at 26 above the space or chamber 27 within the central casing 7. A tapering annular boss 28 depends from this opening 26 into the casing 7.

With the construction described so far, the chambers 27 and 19 are open at their upper ends and a suitable beverage or other liquid may be poured into the chamber 19 and a suitable refrigerant such as a mixture of ice and salt, may be placed in the central chamber 27. The invention provides means for closing the upper ends of the compartments 19 and 27 after suitable substances have been placed in the chambers 19 and 27. The closure means at the top of the device comprises a cap or cover which consists of a pair of complementary hollow semi-annular sections 29 and 30, respectively, and a central hollow section 31, which is circular in cross sectional configuration. The sections 29 and 30 are hinged together by a pair of hinges 32. Each of the hinges 32 has the leaves thereof partially received in confronting notches or cut-away portions of the respective sections 29 and 30, and the leaves of each hinge 32 are secured by fastening devices 33 to the confronting edge portions of the sections 29 and 30 respectively, so that the pintle of the hinge will be disposed in horizontal position above the level of the sections 29 and 30 and the sections 29 and 30 will be in substantially fluid-tight contact with each other along corresponding radial edges when the leaves of the hinges are closed as shown in Figures 1 and 2. The sections 29 and 30 of the top cover have lugs 34 and 35, respectively which depend from their lower sides at the radial edges thereof for a distance slightly greater than the thickness of the top plate 12 and then are turned outwardly as indicated at 34ª and 35ª in Figure 3, and thus are adapted to extend underneath the radial portions 36 of the top plate 12 from opposite edges of such radial portions when the sections 29 and 30 are disposed on the top plate 12 and are swung from open to closed position while superimposed on the top plate. The sections 29 and 30 then will be locked to the top plate 12 and held against displacement from the latter when the leaves of one, at least, of the hinges 32 are held against moving from open to closed position in any suitable manner, as by securing the shackle 37 of a padlock 38 in place in alined openings in the leaves of said one hinge 32.

The inner walls of the sections 29 and 30 cooperate to produce a circular opening, and may be considered as constituting the body of the cap, said body being annular in form when the sections 29 and 30 are in closed position as shown in Figures 1 and 2. The circular opening tapers in cross sectional area toward its lower end in accordance with the taper of the depending boss 28 at the center of the top plate 12, so that an opening through the body of the cap will be practically continuous with the opening which is defined by the depending boss 28. The central section 31 of the cap is in the nature of a plug which is adapted to fit in the central opening of the body of the cap, and to depend into the central opening of the top plate 12, the plug 31 having a fluid-tight fit with the walls of said central openings of the body of the cap and of said top plate 12.

The central section or plug 31 may have a knob or handle at its top, as indicated at 39 so that the central section 31 can be conveniently removed and replaced when desired.

An annular scraper plate or disk 40 is vertically reciprocable in the annular chamber 19 and fits rather closely on the inner casing 7, being provided with teeth in its inner edge as indicated at 41. This plate 40 has openings 42 to accommodate the hereinabove described rods 15. The plate 40 also has a circular series of relatively large apertures 43 for a purpose to be presently described, and is formed with an additional opening 44 through which the threaded lower end portion of an operating rod 45 extends. The operating rod 45 is secured to the plate 40 by clamping nuts 46 and 47, which respectively are threaded on the lower end portion of the rod against the upper and lower faces of the plate 40. The operating rod 45 extends slidably through an opening 48 in the top plate 12 and through an opening in the body of the cap, said opening in the body of the cap being formed by producing suitable notches in the confronting edge portions of the sections 29 and 30 of the cap. The operating rod 45 may have the upper end portion thereof formed in a loop or ring as indicated at 48′ so that it can be conveniently grasped and manipulated to cause vertical movement of the plate 40 in the chamber 19.

From the foregoing description of the various parts of the device, the operation thereof may be readily understood. A suitable beverage may be placed in the compartment 19. This beverage will be visible through the transparent walls 9 and 10 and the device therefore is well adapted for use on a counter in a store or like public place.

A suitable refrigerant then is placed in the compartment 27. It will be understood that the compartments 27 and 19 will be closed when the desired substances have been placed therewithin and when the leaves of one of the hinges 32 are secured against opening, removal of the body of the cap from position to cover the compartment 19 by any unauthorized person without breakage of the locking means of the cap, is prevented. The liquid within the compartment 19 will be kept at a low temperature, and this temperature may be sufficiently low to cause the liquid within the compartment 19 to partially freeze and to adhere to the wall 7 which is of any suitable material that will conduct heat readily. When it is desired to dispense beverage from the device, the handle 48 is manipulated to scrape frozen substance from the wall 7 and to break up such frozen substance into small particles which will fall through the openings 43 into the liquid within the lower part of the compartment 19. Frozen particles therefore will pass through the discharge tube 22 with the liquid when liquid is drawn from the compartment by opening the faucet 25. The substance within the compartment 19 will be kept desirably cool at all times. The refrigerant which has been placed in the central compartment 27 may pass into the lower chamber 3, as when a mixture of salt and ice is used as the refrigerating agent, and the refrigerating substance which passes into the chamber 3 will keep the portion of the discharge pipe 22 that passes through the chamber 3 cool, thus further assuring the dispensing of a desirably cool beverage.

A drain opening 49 may be provided in a side wall of the base 1 at the lower end of the latter for the chamber 3, this drain opening normally being closed by a suitable plug 50. The drain opening 49 also is provided to accommodate a suitable element, not shown, in the event that any suitable refrigerating mechanism may be arranged to extend through the central compartment 27 in lieu of a refrigerating substance.

Obviously, the invention is susceptible of embodiment in forms other than that which is illustrated in the accompanying drawings, and I therefore consider as my own all such modifications and adaptations thereof, as fairly fall within the scope of the appended claims.

I claim:—

1. A beverage dispenser comprising a structure formed to produce an annular chamber for liquid and a central refrigerating chamber, an outlet for said beverage chamber, and a scraper movable in said beverage chamber relatively to the adjacent wall of said refrigerating chamber.

2. A beverage dispenser comprising a structure formed to produce an annular chamber for liquid and a central refrigerating chamber, an outlet for said beverage chamber, and a scraper movable vertically in said beverage chamber relatively to the adjacent wall of said refrigerating chamber, said scraper being operable from the exterior of said structure.

3. A beverage dispenser comprising a structure formed to produce an annular chamber for liquid and a central refrigerating chamber, an outlet for said beverage chamber, and an annular scraper member movable vertically in said annular chamber, said annular scraper having teeth in its inner edge in proximity to the inner wall of said annular chamber.

4. A beverage dispenser comprising a structure formed to produce an annular chamber for liquid and a central chamber for a refrigerant, said annular chamber and said central chamber being open at their upper ends, and a closure structure for the upper ends of said chambers, said closure structure comprising an annular body adapted to cover said annular chamber, and a central section removably fitting in said annular body, said body of the closure structure comprising two semi-annular sections hinged together, and means operable to prevent displacement of the body of said closure structure from position to close said annular chamber when said semi-annular sections are in closed position.

5. A dispenser comprising a hollow base, an inner annular casing upstanding from the base, a second annular casing encircling the said inner casing and upstanding from the base in spaced relation to the inner casing, thus producing an annular chamber, said annular chamber and the space within said central casing both being open at their upper ends, a top plate superimposed on said casings, said top plate having arcuate apertures above said annular chamber, and having a central opening above the central chamber, rods connecting the top plates with the base, a cap comprising a pair of complementary semi-annular sections hinged together and adapted when closed, to cover the annular chamber, and a plug fitting in the opening in the body of the cap and extending into the opening in the top plate for closing said central chamber.

6. A dispenser comprising a hollow base, an inner annular casing upstanding from the base, a second annular casing encircling the said inner casing and upstanding from the base in spaced relation to the inner casing, and upstanding from the base in spaced relation to the inner casing, thus producing an annular chamber, said annular chamber and the space within said central casing both being open at their upper ends, a top plate superimposed on said casings, said top plate having arcuate apertures above said annular chamber, and having a central opening above the central chamber, rods connecting the top plates with the base, a cap comprising a pair of complementary semi-annular sections hinged together and adapted when closed, to cover the annular chamber, a plug fitting in the opening in the body of the cap and extending into the opening in the top plate for closing said central chamber, and lugs depending from said semi-annular sections of the cap and adapted to extend underneath said top plate for locking said semi-annular sections of the cap to the top plate when said semi-annular sections are closed and in position on said top plate.

7. A dispenser comprising a hollow base, an inner annular casing upstanding from the base, a second annular casing encircling the said inner casing and upstanding from the base in spaced relation to the inner casing, thus producing an annular chamber, said annular chamber and the space within said central casing both being open at their upper ends, a top plate superimposed on said casings, said top plate having arcuate apertures above said annular chamber, and having a central opening above the central chamber, rods connecting the top plates with the base, a cap comprising a pair of complementary semi-annular sections hinged together and adapted when closed to cover the annular chamber, a plug fitting in the opening in the body of the cap and extending into the opening in the top plate for closing said central chamber, lugs depending from said semi-annular sections of the cap and adapted to extend underneath said top plate for locking said semi-annular sections of the cap to the top plate when said semi-annular sections are closed and in position on said top plate, and locking means for preventing opening of the hinge means between said semi-annular sections of the cap.

8. A dispenser comprising a hollow base, an inner annular casing upstanding from the base, a second annular casing encircling the said inner casing and upstanding from the base in spaced relation to the inner casing, thus producing an annular chamber, said annular chamber and the space within said central casing both being open at their upper ends, a top plate superimposed on said casings, said top plate having arcuate apertures above said annular chamber, and having a central opening above the central chamber, rods connecting the top plates with the base, a cap comprising a pair of complementary semi-annular sections hinged together and adapted when closed to cover the annular chamber, a plug fitting in the opening in the body of the cap and extending into the opening in the top plate for closing said central chamber, lugs depending from said semi-annular sections of the cap and adapted to extend underneath said top plate for locking said semi-annular sections of the cap to the top plate when said semi-annular sections are closed and in position on said top plate, and locking means for preventing opening of the hinge means between said semi-annular sections of the cap, said annular chamber having an outlet at its bottom extending through an upper portion of the space within said base, said base having a portion of the top wall thereof which underlies the central chamber substantially concavo-convex and provided with an orifice establishing communication between the central chamber and the space within said base.

9. A dispenser comprising a hollow base, an inner annular casing upstanding from the base, a second annular casing encircling the said inner casing and upstanding from the base in spaced relation to the inner casing, thus producing an annular chamber, said annular chamber and the space within said central casing both being open at their upper ends, a top plate superimposed on said casings, said top plate having arcuate apertures above said annular chamber, and having a central opening above the central chamber, rods connecting the top plates with the base, a cap comprising a pair of complementary semi-annular sections hinged together and adapted when closed, to cover the annular chamber, a plug fitting in the opening in the body of the cap and extending into the opening in the top plate for closing said central chamber, lugs depending from said semi-annular sections of the cap and adapted to extend underneath said top plate for locking said semi-annular sections of the cap to the top plate when said semi-annular sections are closed and in position on said top plate, and locking means for preventing opening of the hinge means between said semi-annular sections of the cap, said annular chamber having an outlet at its bottom extending through an upper portion of the space within said base, said base having a portion of the top wall thereof which underlies the central chamber substantially concavo-convex and provided with an orifice establishing communication between the central chamber and the space within said base, said base having a drain outlet for the space within said base.

10. A dispenser comprising a hollow base, an inner annular casing upstanding from the base, a second annular casing encircling the said inner casing and upstanding from the base in spaced relation to the inner casing, thus producing an annular chamber, said annular chamber and the space within said central casing both being open at their upper ends, a top plate superimposed on said casings, said top plate having arcuate apertures above said annular chamber, and having a central opening above the central chamber, rods connecting the top plates with the base, a cap comprising a pair of complementary semi-annular sections hinged together and adapted when closed to cover the annular chamber, a plug fitting in the opening in the body of the cap and extending into the opening in the top plate for closing said central chamber, lugs depending from said semi-annular sections of the cap and adapted to extend underneath said top plate for locking said semi-annular sections of the cap to the top plate when said semi-annular sections are closed and in position on said top plate, and locking means for preventing opening of the hinge means between said semi-annular sections of the cap, said annular chamber having an outlet at its bottom extending through an upper portion of the space within said base, said base having a portion of the top wall thereof which underlies the central chamber substantially concavo-convex and provided with an orifice establishing communication between the central chamber and the space within said base, an annular scraper plate movable within said annular chamber and having teeth in its inner edge in proximity to the central casing, and a vertically extending operating rod secured at its lower end to said scraper plate and extending through openings in the top plate and the cap structure of the device.

NELSON HEMMAN.